(12) United States Patent  (10) Patent No.: US 7,115,036 B2
Masuda  (45) Date of Patent: Oct. 3, 2006

(54) UNIVERSAL COUPLING WITH AN AIR BLEEDING PASSAGE THAT PROVIDES COMMUNICATION BETWEEN THE INSIDE AND OUTSIDE OF A BOOT

(75) Inventor: Toshiyuki Masuda, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 69 days.

(21) Appl. No.: 10/777,161

(22) Filed: Feb. 13, 2004

(65) Prior Publication Data

US 2004/0162147 A1  Aug. 19, 2004

(30) Foreign Application Priority Data

Feb. 14, 2003  (JP) .............................. 2003-036906

(51) Int. Cl.
*F16D 3/84*  (2006.01)
(52) U.S. Cl. ........................ 464/17; 464/173; 277/928
(58) Field of Classification Search .................. 464/17, 464/173, 175; 277/634–636, 928
See application file for complete search history.

(56) References Cited

U.S. PATENT DOCUMENTS 3,441,298 A * 4/1969 Herbenar et al. ........... 277/928

5,297,996 A * 3/1994 Draga ......................... 464/175

FOREIGN PATENT DOCUMENTS

JP  61-117921 U  7/1986

* cited by examiner

*Primary Examiner*—Greg Binda
(74) *Attorney, Agent, or Firm*—Foley & Lardner LLP (57) ABSTRACT

A uniform coupling comprises a torque transmitting unit; first and second shafts that are connected through the torque transmitting unit; a boot covering the torque transmitting unit and having a first end connected to the first shaft and a second end connected to the second shaft, the second end being formed into a cylindrical wall that is tightly disposed on a cylindrical portion of the second shaft and has an axially leading end; a boot cover disposed on the cylindrical portion of the second shaft to cover the cylindrical wall leaving an annular space therebetween, the boot cover having an inside end surface that contacts the axially leading end of the cylindrical wall; and an air bleeding passage that communicates the inside of the boot with the outside of the same. The air bleeding passage includes a groove formed in an inner surface of the cylindrical wall and a passage that is defined between the axially leading end of the cylindrical wall and the inside end surface of the boot cover.

8 Claims, 7 Drawing Sheets

UNIVERSAL COUPLING WITH AN AIR BLEEDING PASSAGE THAT PROVIDES COMMUNICATION BETWEEN THE INSIDE AND OUTSIDE OF A BOOT

BACKGROUND OF THE INVENTION

1. Field of the Invention

The present invention relates in general to universal couplings, such as a coupling applied to a propeller shaft and the like, for wheeled motor vehicles, and more particularly to the universal couplings of a type that can be easily assembled without inducing undesirable blocking of an air bleeding passage that provides a fluid communication between the inside of the coupling and the outside of the same.

2. Description of Related Art

In order to clarify the task of the present invention, one known universal coupling will be briefly described in the following, which is disclosed in Japanese Utility Model Provisional Publication (Jikkaisho) 61-117921.

The universal coupling of the publication generally comprises a torque transmitting unit through which two shafts are connected. A boot extends between the two shafts while covering the torque transmitting unit. For connection with the shafts, each axial end of the boot has a connecting mouth. The interior of the boot is filled with a grease for lubricating elements of the torque transmitting unit.

For releasing an undesired pressure inevitably produced in the boot due to thermal expansion of the interior of the boot, there is provided an air bleeding passage between one of the shafts and the corresponding connecting mouth of the boot. For protecting the air bleeding passage from sludge, water and the like, a boot cover is connected to the shaft in a manner to cover the connecting mouth of the boot while keeping a certain clearance therebetween.

SUMMARY OF THE INVENTION

However, in the universal coupling of the above-mentioned publication, it is difficult or at least troublesome to assemble the coupling without inducing blocking of the air bleeding passage. That is, under assembling of the coupling, it tends to occur that the boot cover is deformed toward the connecting mouth of the boot. If the boot cover is brought into contact with the connecting mouth of the boot, the air bleeding passage is blocked and thus the pressure releasing function of the passage becomes poor.

It is therefore an object of the present invention to provide a universal coupling which is free of the above-mentioned drawback.

That is, according to the present invention, there is provided a universal coupling which can be easily assembled without inducing an undesirable blocking of an air bleeding passage that provides fluid communication between the interior of the coupling and the outside of the same.

According to a first aspect of the present invention, there is provided a universal coupling which comprises a torque transmitting unit; first and second shafts that are connected through the torque transmitting unit; a boot covering the torque transmitting unit and having a first end connected to the first shaft and a second end connected to the second shaft, the second end being formed into a cylindrical wall that is tightly disposed on a cylindrical portion of the second shaft and has an axially leading end; a boot cover disposed on the cylindrical portion of the second shaft to cover the cylindrical wall leaving an annular space therebetween, the boot cover having an inside end surface that contacts the axially leading end of the cylindrical wall; and an air bleeding passage that communicates the inside of the boot with the outside of the same, the air bleeding passage including a first passage that is at least one groove formed in an inner surface of the cylindrical wall and a second passage that is defined between the axially leading end of the cylindrical wall and the inside end surface of the boot cover.

According to a second aspect of the present invention, there is provided a universal coupling which comprises a torque transmitting unit; first and second shafts that are connected through the torque transmitting unit; an elastic boot covering the torque transmitting unit and having a first end connected to the first shaft and a second end connected to the second shaft, the second end being formed into a cylindrical wall that is tightly disposed on a cylindrical portion of the second shaft and has an axially leading end; an elastic boot cover disposed on the cylindrical portion of the second shaft to cover the cylindrical wall leaving an annular space therebetween, the boot cover having an inside end surface that contacts the axially leading end of the cylindrical wall; and an air bleeding passage that communicates the inside of the boot with the outside of the same, the air bleeding passage including at least one axially extending groove formed in an inner surface of the cylindrical wall and at least one radially extending groove formed in the axially leading end of the cylindrical wall.

According to a third aspect of the present invention, there is provided a universal coupling which comprises a torque transmitting unit; first and second shafts that are connected through the torque transmitting unit; an elastic boot covering the torque transmitting unit and having a first end connected to the first shaft and a second end connected to the second shaft, the second end being formed into a cylindrical wall that is tightly disposed on a cylindrical portion of the second shaft and has an axially leading end; an elastic boot cover disposed on the cylindrical portion of the second shaft to cover the cylindrical wall leaving an annular space therebetween, the boot cover having an inside end surface that contacts the axially leading end of the cylindrical wall; and an air bleeding passage that communicates the inside of the boot with the outside of the same, the air bleeding passage including at least one axially extending groove that is formed in an inner surface of the cylindrical wall and a clearance that is defined between the axially leading end and the inside end surface, the inside end surface being formed with projections that contact the axially leading end to provide the clearance.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, two embodiments 100 and 200 of the present invention will be described in detail with reference to the accompanying drawings.

For ease of description, various directional terms, such as, right, left, upper, lower, rightward and the like are used in the following. However, such terms are to be understood with respect to only a drawing or drawings on which a corresponding part or portion is shown.

Referring to FIGS. 1 to 5, there is shown universal coupling 100 which is a first embodiment of the present invention. It is to be noted that universal coupling 100 shown in the drawings is of a type particularly used for a propeller shaft of a wheeled motor vehicle.

Figure 2:
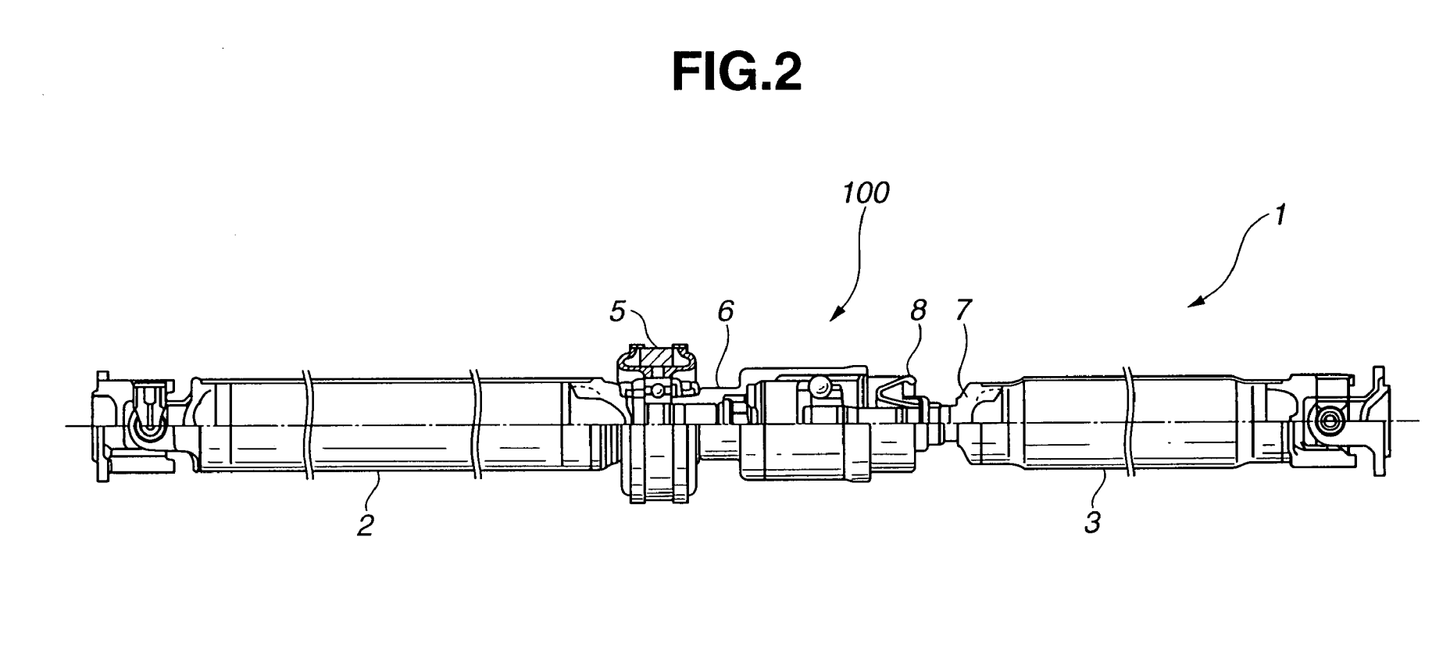
FIG. 2 is a partially sectional view of the uniform coupling of the first embodiment of the present invention.

In FIG. 2, there is shown a propeller shaft 1 to which universal coupling 100 of the first embodiment is practically applied.

Propeller shaft 1 shown comprises a drive shaft (or first shaft) 2 that is connected to an output shaft of a transmission (not shown), a driven shaft (or second shaft) 3 that is connected to drive road wheels (not shown) through a differential (not shown), and the universal coupling 100 through which the drive and driven shafts 2 and 3 are connected. Denoted by numeral 5 is a center bearing through which an inward end of drive shaft 2 is rotatably supported by a vehicle body (not shown).

Figure 1:
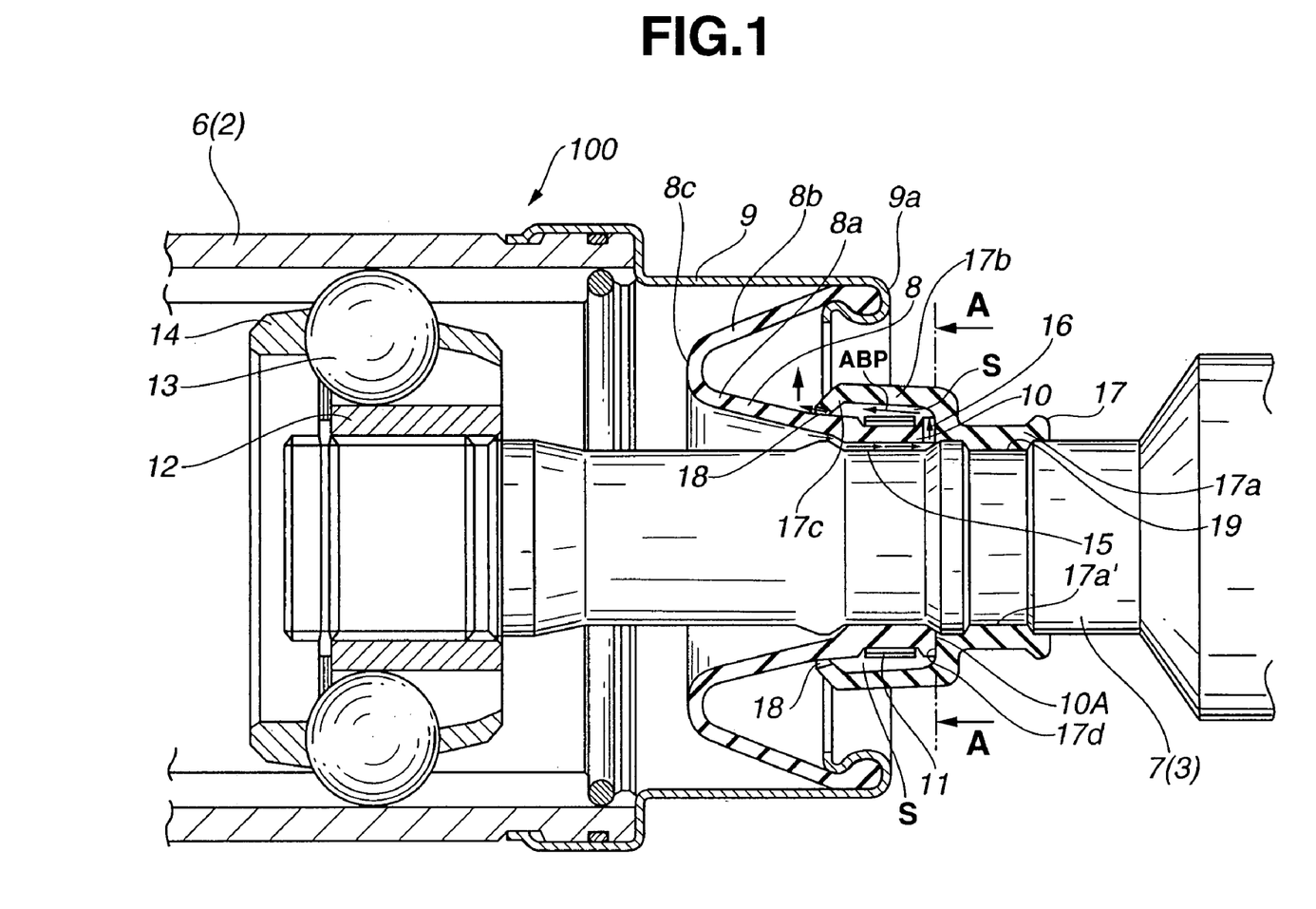
FIG. 1 is a sectional view of an essential portion of a universal coupling, which is a first embodiment of the present invention.

As is seen from FIG. 1, drive shaft 2 is integrally formed at a right end thereof with a tubular portion 6 that forms an outer race of universal coupling 100. Driven shaft 3 is integrally formed at a left end with a cylindrical stub portion 7 that is concentrically received in tubular portion 6 of drive shaft 2 as shown.

universal coupling 100 comprises the outer race that is provided by tubular portion 6, an annular inner race 12 that is provided on a left end of cylindrical stub portion 7, a plurality of torque transmission balls 13 that are rotatably disposed between inner race 12 and the outer race (viz., an inner wall of tubular portion 6), and an annular cage 14 that rotatably holds the balls 13. With this arrangement, tubular portion 6 and stub portion 7 are connected allowing mutual slanting movement therebetween, like a universal joint. That is, outer race 6, inner race 12, balls 13 and annular cage 14 constitute a torque transmitting unit.

Between tubular portion 6 of drive shaft 2 and stub portion 7 of driven shaft 3, there extends a rubber boot 8, so that the interior of tubular portion 6 is sealed by boot 8. The interior of tubular portion 6 is filled with a grease for lubricating inner race 12, outer race 6, torque transmission balls 13 and annular cage 14.

As is shown in FIG. 1, a cylindrical boot holder 9 of metal is fixed to the open end of the tubular portion 6 of drive shaft 2. Boot holder 9 has a caulked leading end 9a by which one end of boot 8 is pinched or held, as shown.

As shown, boot 8 comprises a conical inner portion 8a, a conical outer portion 8b and an annular middle portion 8c through which conical inner and outer portions 8a and 8b are integrally connected. Thus, boot 8 has a generally W-shaped cross section when sectioned along a longitudinal axis thereof, as shown.

An outer periphery of conical outer portion 8b is pinched by caulked end 9a of boot holder 9, and a smaller diameter end of boot 8 constitutes a cylindrical wall 10 that is tightly disposed on cylindrical stub portion 7 of driven shaft 3 by means of a clamping ring 11.

Figure 3:
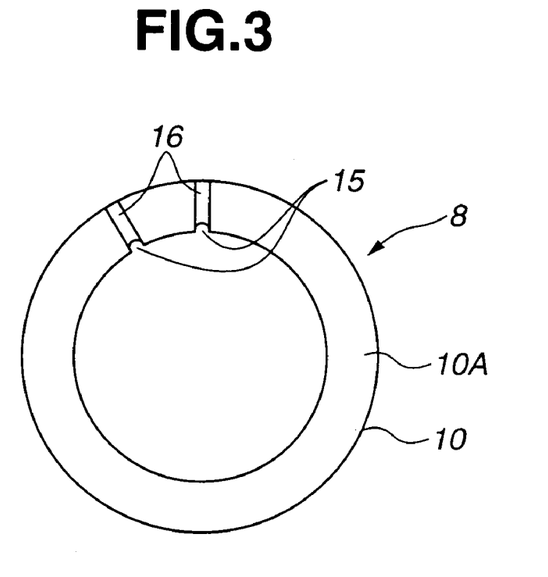
FIG. 3 is a sectional view taken along the line A—A of FIG. 1 with some parts removed.
Figure 4:
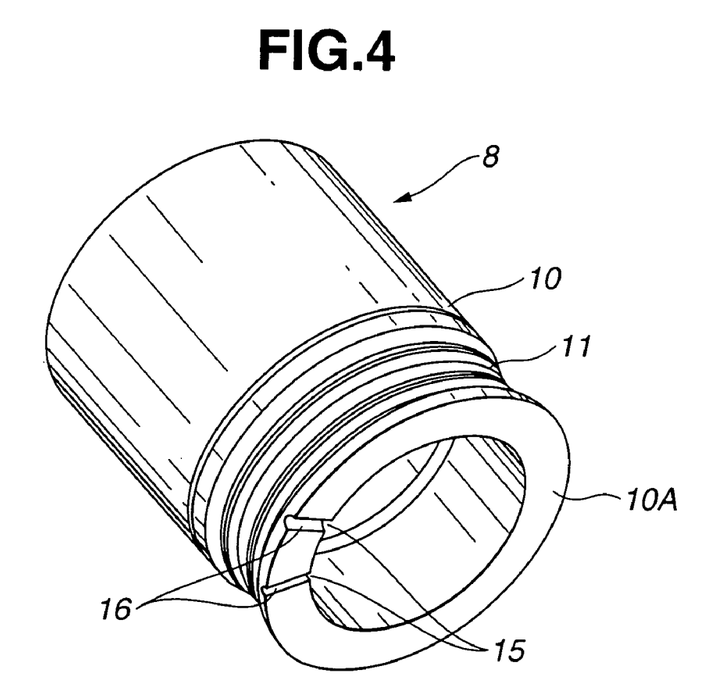
FIG. 4 is a perspective view of an essential portion of the universal coupling of the first embodiment.

As is seen from FIGS. 1, 3 and 4, cylindrical wall 10 of boot 8 is formed at its inner cylindrical surface with two parallel grooves (or first passage) 15 that extend axially. Furthermore, cylindrical wall 10 is formed at its annular flat front end (or axially leading end) 10A with two radially extending grooves (or second passage) 16 that are connected to terminal ends of the axially extending parallel grooves 15. As will become apparent hereinafter, these grooves 15 and 16 constitute part of an air bleeding passage "ABP" through which the pressure inevitably produced in tubular portion 6 can be released to the outside of coupling 100.

As is seen from FIG. 1, a cylindrical rubber boot cover 17 is disposed on cylindrical stub portion 7 of driven shaft 3, which covers cylindrical wall 10 of boot 8 having a given annular space "S" left therebetween.

That is, boot cover 17 comprises a cylindrical base portion 17a that is tightly disposed on stub portion 7, a cylindrical cover portion 17b that is raised radially outward from a left end of base portion 17a to cover cylindrical wall 10 having the given annular space "S" kept therebetween, and a leading lip portion 17c that is bent radially inward from a left end of cover portion 17b and contacts the conical inner portion 8a of boot 8, as shown.

Cylindrical base portion 17a of boot cover is formed on its inner surface with an annular projection 17a' that is intimately thrust in an annular groove 19 formed in cylindrical stub portion 7 of driven shaft 3.

Designated by 17d is an inside end surface of cylindrical base portion 17a that is formed on a stepped portion defined between the cylindrical base portion 17a and the cylindrical cover portion 17b and contacts annular flat front end 10A of cylindrical wall 10 of boot 8.

As is seen from FIG. 1, leading lip portion 17c of boot cover 17 is formed at its inner surface with a plurality of grooves 18 that extend axially, which constitute part of the air bleeding passage "ABP".

Thus, upon assembly of universal coupling 100, there is produced the air bleeding passage "ABP" that includes the axially extending parallel grooves 15, the radially extending grooves 16, the given annular space "S" and the grooves 18. Through the air bleeding passage "ABP" thus produced, an increased pressure produced in tubular portion 6 in which the essential elements 12, 13 and 14 are installed can be released to the open air.

Figure 5:
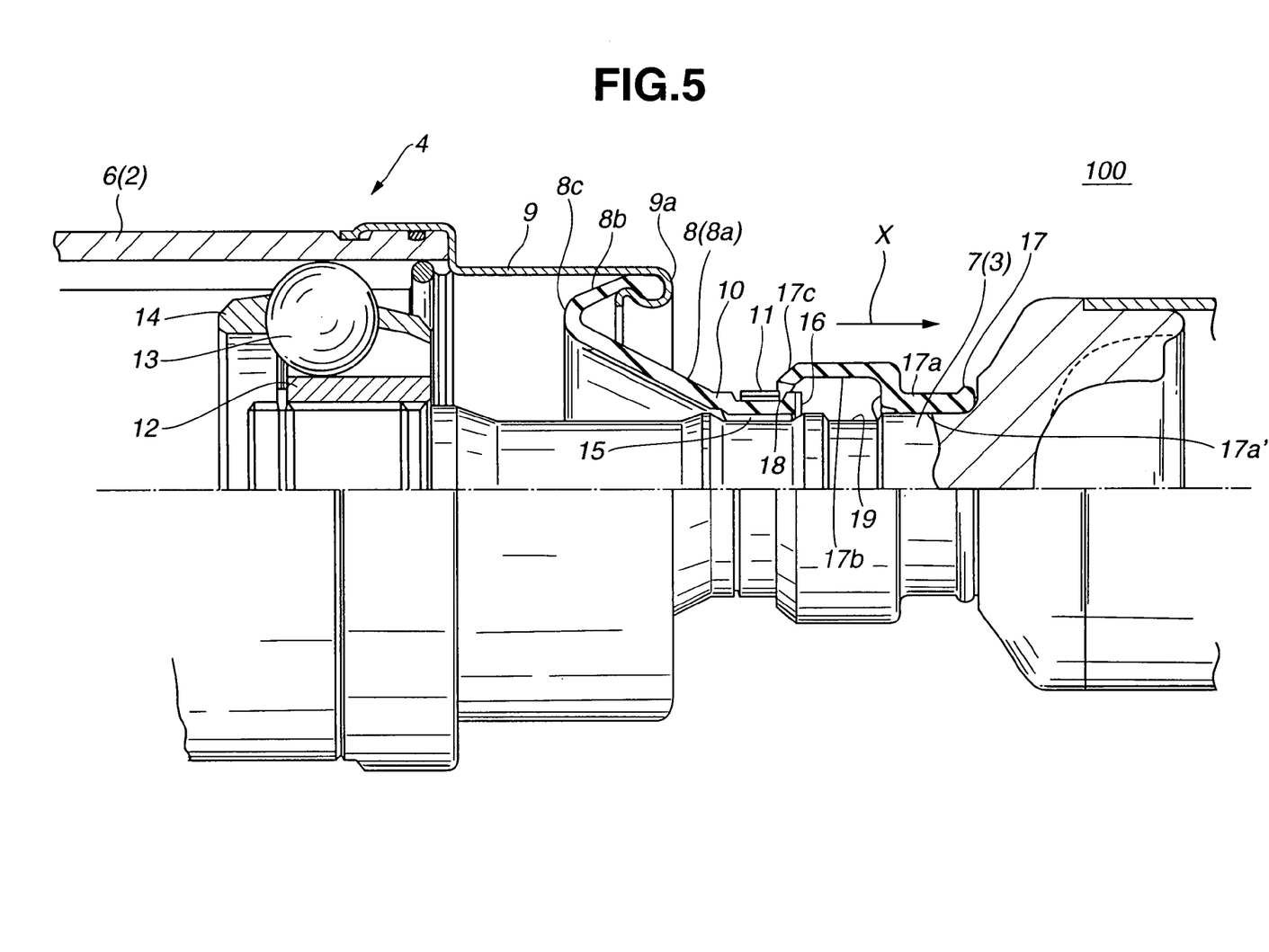
FIG. 5 is a sectional view of an essential portion of the universal coupling of the first embodiment in process of assembly.

FIG. 5 shows one step of assembling coupling 100. That is, for simplifying the steps of assembly, boot 8 and boot cover 17 are coupled previously and these thus coupled are temporarily mounted on cylindrical stub portion 7 of driven shaft 3 having annular projection 17a' put in annular groove 19 of stub portion 7, as is understood from FIG. 1. Then, as is seen from FIG. 5, only boot cover 17 is displaced rightward as in indicated by an arrow "X" to such a position that the outer surface of cylindrical wall 10 of boot 8 is exposed to the outside. Then, clamping ring 11 is disposed about the cylindrical wall 10 to tightly fix boot 8 to stub portion 7 of driven shaft 3, and then, boot cover 17 is returned or moved to its original position.

As is seen from FIG. 1, upon returning of boot cover 17 to its original position, inside end surface 17d of boot cover 17 is brought into contact with annular flat front end 10A of cylindrical wall 10 of boot 8. However, provision of radially extending grooves 16 formed in the front end 10A keeps the open condition of the air bleeding passage "ABP".

Referring to FIGS. 6 to 9, there is shown a universal coupling 200 which is a second embodiment of the present invention.

Since coupling 200 of this embodiment is similar to coupling 100 of the above-mentioned first embodiment, only parts or portions different from those of the first embodiment will be described in detail in the following, and such similar parts or portions are denoted by the same numerals.

That is, in the second embodiment 200, there is no groove that corresponds to the radially extending grooves 16 used in the first embodiment 100. That is, in place of such grooves 16, the following measure is employed for establishing the open condition of air bleeding passage "ABP".

Figure 7:
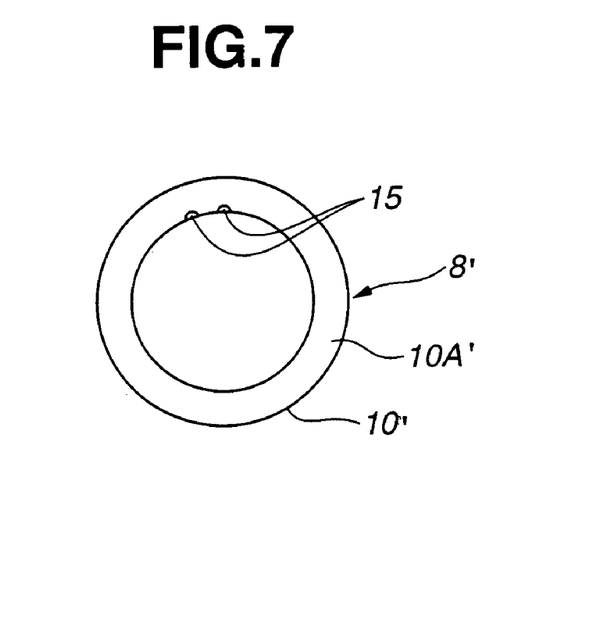
FIG. 7 is a sectional view taken along the line B—B of FIG. 6 with some parts removed.

As is seen from FIG. 7, like the above-mentioned first embodiment 100, cylindrical wall 10' of boot 8' is formed at its inner wall with two parallel grooves (or first passage) 15 that extend radially. However, annular flat front end (or axially leading end) 10A' of cylindrical wall 10' has no radially extending grooves.

Figure 8:
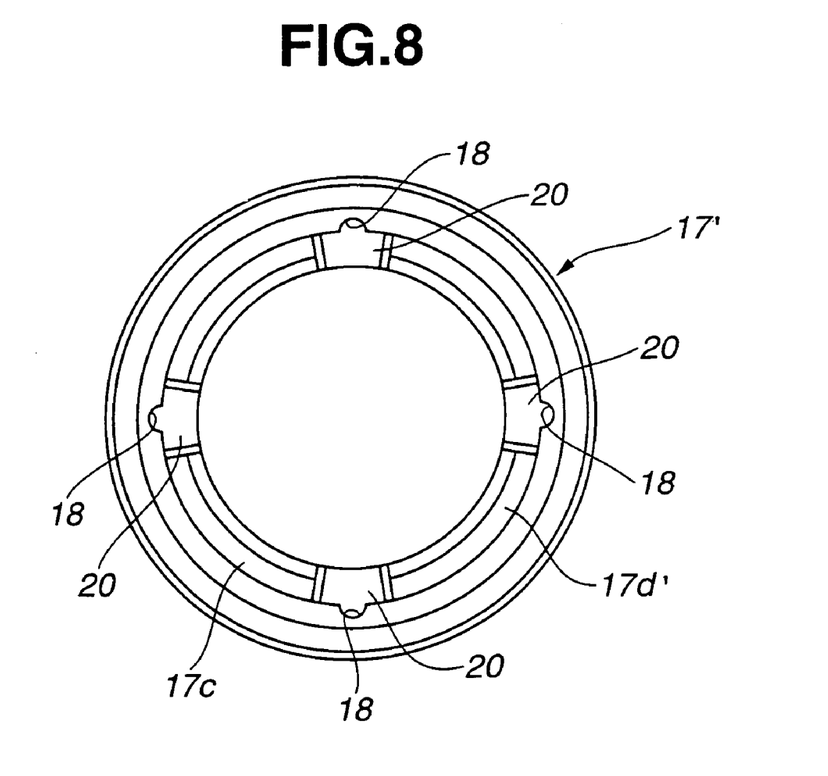
FIG. 8 is a sectional view taken along the line C—C of FIG. 6 with some parts removed.
Figure 9:
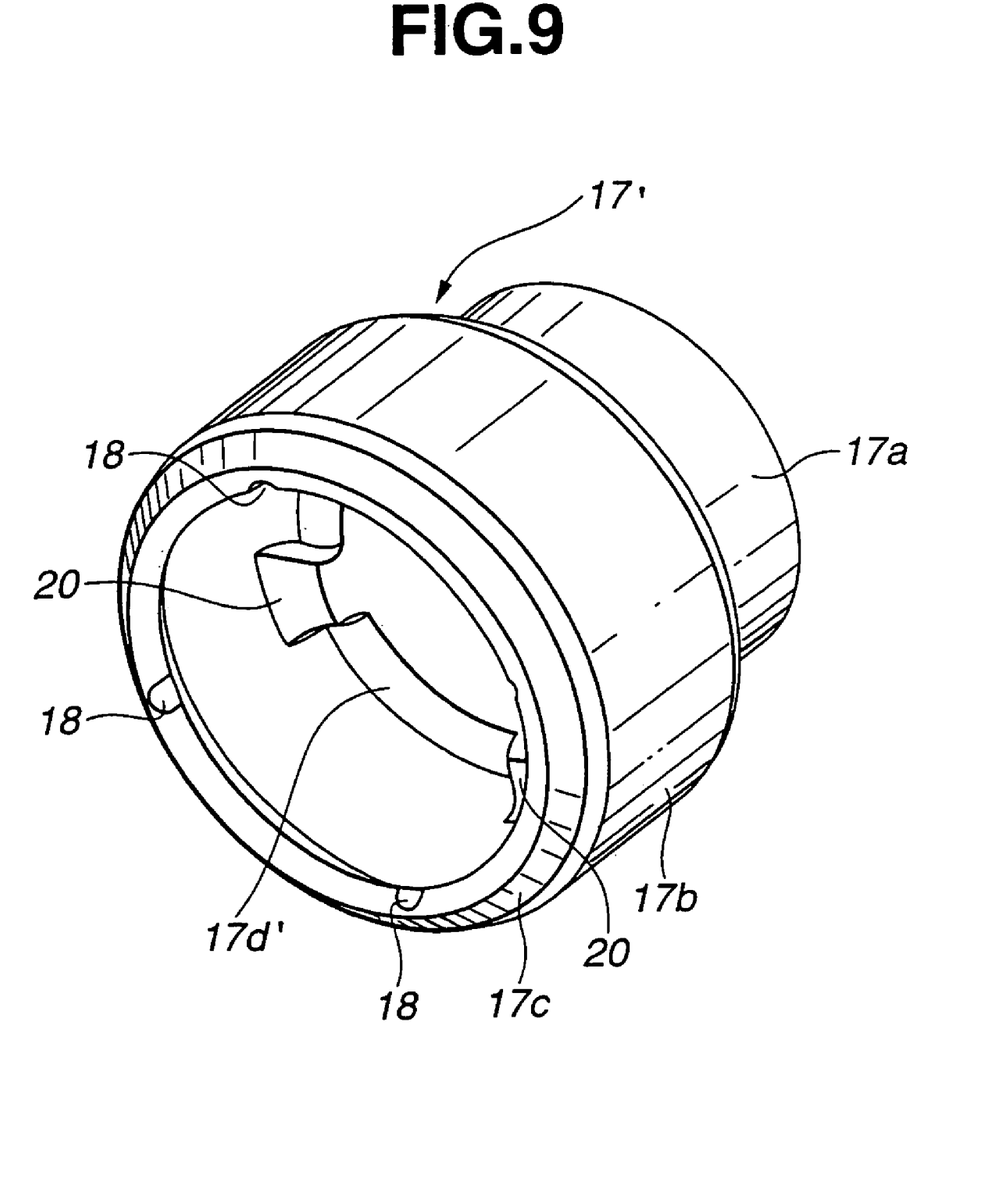
FIG. 9 is a perspective view of a boot cover employed in the second embodiment.

Instead, as is seen from FIGS. 8 and 9, inside end surface 17d of boot cover 17' is formed with equally spaced four projections 20 whose top surfaces are in contact with annular flat front end 10A' of cylindrical wall 10'.

Figure 6:
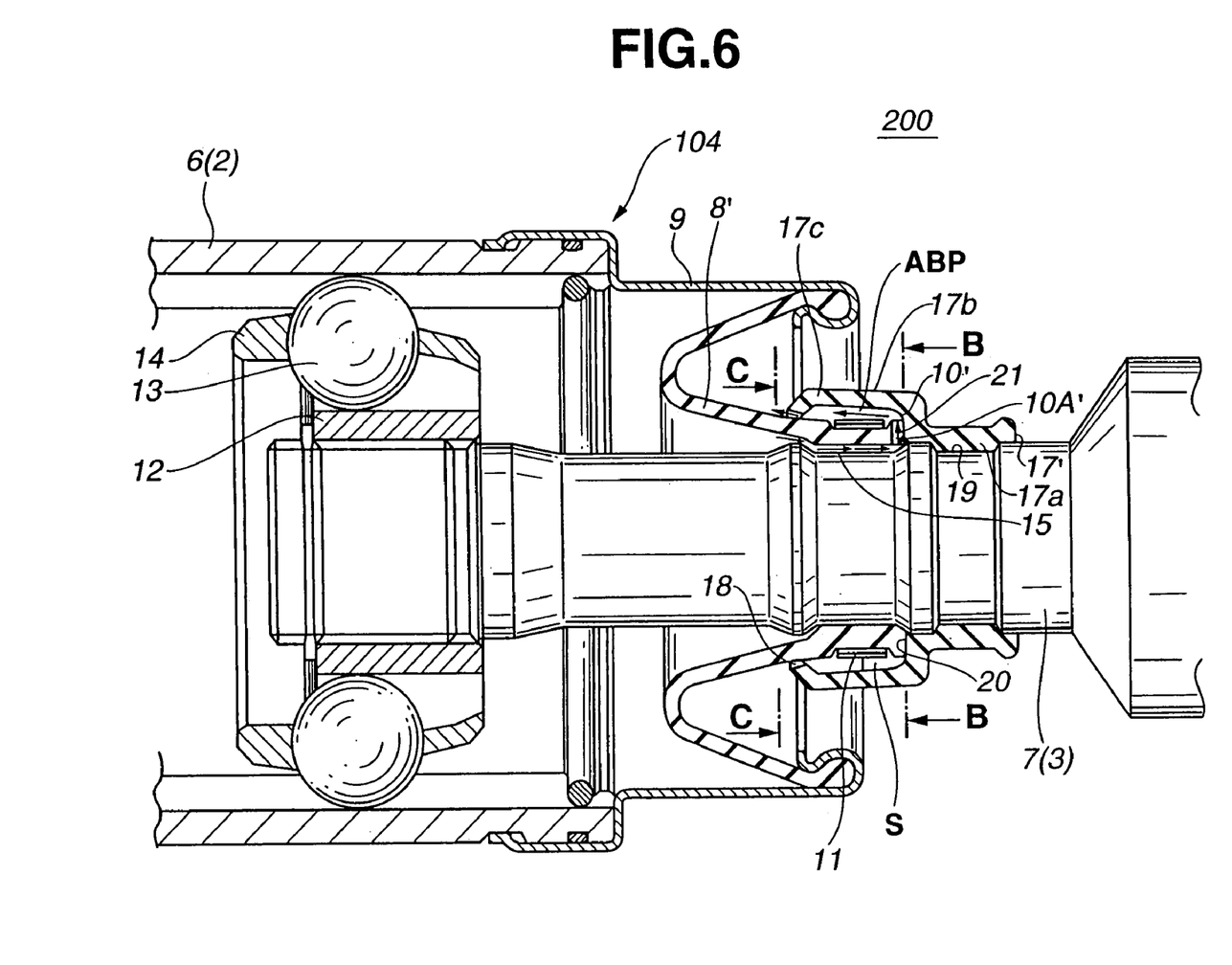
FIG. 6 is a view similar to FIG. 1, but showing a second embodiment of the present invention.

Accordingly, as is understood from FIG. 6, upon assembly of coupling 200, there are defined four clearances (or second passage) 21 between inside end surface 17d and annular flat front end 10A' through which two parallel grooves 15 and the given annular space "S" are fluidly communicated. Thus, also in the second embodiment 200, the air bleeding passage "ABP" is established, that includes the axially extending parallel grooves (or first passage) 15, the four clearances (or second passage) 21, the given annular space "S" and the grooves 18.

In the second embodiment 200, the fluid communication means between two parallel grooves 15 and the given annular space "S" is provided substantially by boot cover 17' that is not affected by a clamping force produced by clamping ring 11. Thus, the open condition of air bleeding passage "ABP" is much assuredly achieved.

If desired, in the second embodiment 200, in place of the projections 20, inside end surface 17d of boot cover 17' may be formed with radially extending grooves through which two parallel grooves 15 and the given annular space "S" is established.

Although the foregoing description is directed universal coupling 100 and 200 that are applied the propeller shaft 1, the member to which the coupling of the invention is applied may be any shaft other than propeller shaft 1.

The entire contents of Japanese Patent Application 2003-36906 filed Feb. 14, 2003 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A universal coupling comprising:
    a torque transmitting unit;
    first and second shafts that are connected through the torque transmitting unit;
    a boot covering the torque transmitting unit and having a first end connected to the first shaft and a second end connected to the second shaft, the second end being formed into a cylindrical wall that is tightly disposed on a cylindrical portion of the second shaft and has an axially leading end;
    a boot cover disposed on the cylindrical portion of the second shaft to cover the cylindrical wall leaving an annular clearance therebetween, the boot cover having an inside end surface that contacts the axially leading end of the cylindrical wall; and
    an air bleeding passage that communicates the inside of the boot with the outside of the same, the air bleeding passage including a first passage that is at least one groove formed in an inner surface of the cylindrical wall and a second passage that is defined between the axially leading end of the cylindrical wall and the inside end surface of the boot cover, the second passage being provided by at least one of the axially leading end and the inside end surface,
    wherein the inside end surface is formed with projections that contact the axially leading end to provide a clearance between the inside surface and the axially leading end, the clearance constituting the second passage.

2. A universal coupling as claimed in claim 1, in which the boot cover comprises:
    a cylindrical base portion that is disposed on the cylindrical portion of the second shaft;
    a cylindrical cover portion that is radially outward from an end of the cylindrical base portion to cover the cylindrical wall having the annular space kept therebetween; and
    a leading lip portion that is bent radially inward from one end of the cylindrical cover portion to contact an outer surface of the boot,
    wherein the inside end surface of the boot cover is formed on a stepped portion defined between the cylindrical base portion and the cylindrical cover portion.

3. A universal coupling as claimed in claim 2, in which the cylindrical base portion is formed on its inner surface with an annular projection that is intimately put in an annular groove formed around the cylindrical portion of the second shaft.

4. A universal coupling as claimed in claim 2, in which the leading lip portion is formed with a plurality of grooves.

5. A universal coupling as claimed in claim 1, in which the boot and the boot cover are each constructed of an elastic material.

6. A universal coupling as claimed in claim 1, in which the first shaft is adapted to connect to an output shaft of a transmission and the second shaft is adapted to connect to drive road wheels through a differential.

7. A universal coupling as claimed in claim 1, in which the torque transmitting unit comprises:
    a tubular portion defined by the first shaft;
    a plurality of balls each being rotatably disposed between an inner cylindrical surface of the tubular portion of the first shaft and the cylindrical portion of the second shaft; and
    an annular cage that rotatably holds the balls.

8. A universal coupling comprising:
    a torque transmitting unit;
    first and second shafts that are connected through the torque transmitting unit;

an elastic boot covering the torque transmitting unit and having a first end connected to the first shaft and a second end connected to the second shaft, the second end being formed into a cylindrical wall that is tightly disposed on a cylindrical portion of the second shaft and has an axially leading end;

an elastic boot cover disposed on the cylindrical portion of the second shaft to cover the cylindrical wall leaving an annular space therebetween, the boot cover having an inside end surface that contacts the axially leading end of the cylindrical wall; and an air bleeding passage that communicates the inside of the boot with the outside of the same, the air bleeding passage including at least one axially extending groove that is formed in an inner surface of the cylindrical wall and a clearance that is defined between the axially leading end and the inside end surface, the inside end surface being formed with projections that contact the axially leading end to provide the clearance.

* * * * *